US007922204B2

(12) United States Patent
Yoshii et al.

(10) Patent No.: US 7,922,204 B2
(45) Date of Patent: Apr. 12, 2011

(54) VIBRATION-ISOLATING DEVICE FOR STEERING WHEEL OF TRAVELING WORKING VEHICLE WITH WHEEL STEERING MECHANISM

(75) Inventors: Nobuyuki Yoshii, Kashihara (JP); Kiyoshige Maezawa, Kishiwada (JP); Tadashi Nakamura, Kawachinagano (JP); Hiroki Fukudome, Sakai (JP)

(73) Assignee: Kubota Corporation, Osaka (JP)

( * ) Notice: Subject to any disclaimer, the term of this patent is extended or adjusted under 35 U.S.C. 154(b) by 183 days.

(21) Appl. No.: 12/212,232

(22) Filed: Sep. 17, 2008

(65) Prior Publication Data
US 2009/0152781 A1 Jun. 18, 2009

(30) Foreign Application Priority Data
Dec. 13, 2007 (JP) ................................. 2007-322206

(51) Int. Cl.
*B62D 1/16* (2006.01)
(52) U.S. Cl. ...................................................... 280/779
(58) Field of Classification Search .................. 280/771, 280/775, 777, 779; 464/87, 93, 94, 98
See application file for complete search history.

(56) References Cited

U.S. PATENT DOCUMENTS

| 2,173,360 | A | * | 9/1939 | Froussard | 464/93 |
| 2,793,513 | A | * | 5/1957 | Anderson | 464/87 |
| 3,500,659 | A | * | 3/1970 | Martin | 464/93 |
| 3,793,849 | A | * | 2/1974 | Downey | 464/93 |
| 3,798,924 | A | * | 3/1974 | Downey | 464/93 |
| 2005/0218642 | A1 | * | 10/2005 | Yamaguchi et al. | 280/779 |

FOREIGN PATENT DOCUMENTS

| JP | 08207784 | 8/1996 |
| JP | 2007237786 | 9/2007 |

* cited by examiner

*Primary Examiner* — Paul N Dickson
*Assistant Examiner* — Robert A Coker
(74) *Attorney, Agent, or Firm* — The Webb Law Firm

(57) ABSTRACT

A vibration-isolating device for a steering wheel of a travelling working vehicle equipped with a wheel steering mechanism includes a first steering shaft (32) that transmits rotational displacement, the first steering shaft being operatively connected to the steering wheel (7); a second steering shaft (33) that transmits rotational displacement, the second steering shaft being operatively connected to the wheel steering mechanism (P, 23); and a vibration-isolating connecting mechanism (31) that operatively connects the first steering shaft (32) and the second steering shaft (33) to each other so that rotational displacement can be transmitted. When the angles of rotational displacement of the first steering shaft (32) and the second steering shaft (33) are within ranges of rotation angles for linearly driving the vehicle, rotational displacement cannot be transmitted between the first steering shaft (32) and the second steering shaft (33).

5 Claims, 6 Drawing Sheets

VIBRATION-ISOLATING DEVICE FOR STEERING WHEEL OF TRAVELING WORKING VEHICLE WITH WHEEL STEERING MECHANISM

BACKGROUND OF THE INVENTION

1. Field of the Invention

The present invention relates to a vibration-isolating device for a steering wheel of a traveling working vehicle equipped with a wheel steering mechanism.

2. Description of the Related Art

A device disclosed in JP 2007-237786A (paragraph [0023], FIGS. 2 to 4) in which a steering post is supported on the top surface of a transmission case via rubber vibration isolators, and a steering shaft connected to a steering wheel is supported within the steering post, is known as a steering wheel vibration-isolating device of a working vehicle of this type.

In this conventional device, only the steering post supported on the transmission case is supported in a vibration-isolating manner, so that vibration transmitted from a wheel steering mechanism to the steering wheel through the steering shaft cannot be blocked, and there is a problem in that vibration of the steering wheel cannot be suppressed.

Moreover, a structure disclosed in JP 8-207784A, in which a steering shaft connected to a steering wheel is supported within a steering post via a cylindrical rubber provided in an upper portion of the steering post and upper and lower rubber bushes holding a bearing inside thereof, is known as a structure for supporting a steering shaft.

Also in this conventional structure, the steering shaft is supported in a vibration-isolating manner only with respect to the steering post, so that vibration transmitted from a wheel steering mechanism to the steering wheel through the steering shaft cannot be blocked, and so there is the problem in that vibration of the steering wheel cannot be suppressed.

SUMMARY OF THE INVENTION

It is an object of the present invention to provide a steering wheel vibration-isolating device of a working vehicle that is capable of effectively suppressing vibration transmitted to a steering wheel through a steering shaft.

In order to achieve this object, a vibration-isolating device for a steering wheel according to the present invention, of a traveling working vehicle equipped with a wheel steering mechanism, includes a first steering shaft that transmits rotational displacement, the first steering shaft being operatively connected to the steering wheel; a second steering shaft that transmits rotational displacement, the second steering shaft being operatively connected to the wheel steering mechanism; and a vibration-isolating connecting mechanism that operatively connects the first steering shaft and the second steering shaft to each other so that rotational displacement can be transmitted. The vibration-isolating connecting mechanism has the following functions: when the angles of rotational displacement of the first and second steering shafts are within ranges of rotation angles for linearly driving the vehicle, rotational displacement cannot be transmitted between the first steering shaft and the second steering shaft, and when the angles of rotational displacement of the first and second steering shafts are beyond the ranges of rotation angles for linearly driving the vehicle, rotational displacement can be transmitted between the first steering shaft and the second steering shaft.

When the angles of rotational displacement of the first and second steering shafts are within the ranges of rotation angles for linearly driving the vehicle, that is, when the first and second steering shafts are in a linear drive position, the first steering shaft and the second steering shaft are not interlocked with each other. Accordingly, vibration transmitted from the wheel steering mechanism to the second steering shaft is not transmitted to the first steering shaft. Thus, vibration is not transmitted to the steering wheel.

When the angles of rotational displacement of the first and second steering shafts are beyond the ranges of rotation angles for linearly driving the vehicle, that is, when the first and second steering shafts are in a turn position, the first steering shaft and the second steering shaft are interlocked with each other. However, the steering shafts are interlocked via the vibration-isolating connecting mechanism, so that the transmission of vibration from the second steering shaft to the first steering shaft is suppressed. Accordingly, the transmission of vibration to the steering wheel is blocked or sufficiently suppressed.

With the above-described vibration-isolating device for a steering wheel according to the present invention, the transmission of vibration from the wheel steering mechanism to the steering wheel can be suppressed or blocked, and comfortable maneuverability can be achieved.

In one of preferred embodiments of the vibration-isolating connecting mechanism, at least one engage member connected to one of the first and second steering shafts, at least one opposite engage member connected to the other one of the first and second steering shafts, and a vibration-isolating rubber member disposed between the engage member and the opposite engage member are provided. When the angles of rotational displacement of the first and second steering shaft are within the ranges of rotation angles for linearly driving the vehicle, at least one of the engage member and the opposite engage member is not in contact with the vibration-isolating rubber member. When the angles of rotational displacement of the first and second steering shafts are beyond the ranges of rotation angles for linearly driving the vehicle, the engage member and the opposite engage member are in contact with the vibration-isolating rubber member.

In one of specific examples of such a preferred vibration-isolating connecting mechanism, the engage member and the opposite engage member are projections projecting from one of the steering shafts toward the other one of the steering shafts, and the vibration-isolating rubber member has openings that receive the projections therein. More preferably, the engage member is formed as a connecting pin, the opposite engage member is formed as an opposite connecting pin, the openings of the vibration-isolating rubber member are formed as a fitting hole fitting to the connecting pin or an opposite fitting hole fitting to the opposite connecting pin, the hole diameter of the fitting hole is the same as the pin diameter of the connecting pin, and the hole diameter of the opposite fitting hole is larger than the pin diameter of the opposite connecting pin. According to such a specific example, connecting pins and a vibration-isolating body that are engaged with each other are utilized in order to operatively connect the first steering shaft and the second steering shaft to each other. Furthermore, a part of the fitting holes of the vibration-isolating body fitting to the connecting pins is formed to have a larger diameter than the diameter of the connecting pins. Thus, as long as the angles of rotational displacement of the first and second steering shafts are within the ranges of rotation angles for linearly driving the vehicle, one of the first and second steering shafts is engaged with (connected to) the vibration-isolating body, and the other one of the first and second steering shafts is disengaged from the vibration-isolating body. When the steering wheel is in a linear drive position, the connecting pin of the other one of the first and second steering shafts is clear of the fitting hole, so that the transmission of vibration from the wheel steering mechanism to the first steering shaft is blocked at that clearance. When the steering wheel is operated into a turn position, the connecting pin is brought into contact with the fitting hole to operatively connect the first steering shaft and the second steering shaft to each other. However, the transmission of vibration from the wheel steering mechanism to the first steering shaft is weakened by the vibration-isolating body.

In the linear drive position, a driver tends to easily feel vibration because the driver often just puts the hands on the steering wheel rather than operating the steering wheel. According to the present invention, the first steering shaft and the second steering shaft are not in mechanical contact with each other in this linear drive position, so that vibration is seldom transmitted, and the driver is thus less likely to feel vibration even though the driver often puts the hands on the steering wheel.

In one of specific examples of such a preferred vibration-isolating connecting mechanism, the engage member is an accepting member connected to one of the steering shafts, the opposite engage member is a non-circular member connected to the other one of the steering shafts and accommodated in an internal space defined by a circumferential wall of the accepting member, and the vibration-isolating rubber member has a shape that is interposed in a space between the circumferential wall of the accepting member and the non-circular member in a radial direction. In this specific example, when the steering wheel is in the linear drive position, a clearance is created between the non-circular member and the vibration-isolating rubber member, so that vibration from the wheel steering mechanism to the first steering shaft is blocked at that clearance. When the steering wheel is operated into the turn position, the non-circular member and the vibration-isolating rubber member are brought into contact with each other to interlock the first steering shaft and the second steering shaft with each other. However, the transmission of vibration from the wheel steering mechanism to the first steering shaft is weakened by the vibration-isolating rubber member.

Other features and advantages of the present invention will become apparent from the following description of embodiments by means of the accompanying drawings.

DETAILED DESCRIPTION OF THE PREFERRED EMBODIMENTS

First Embodiment

Figure 1:
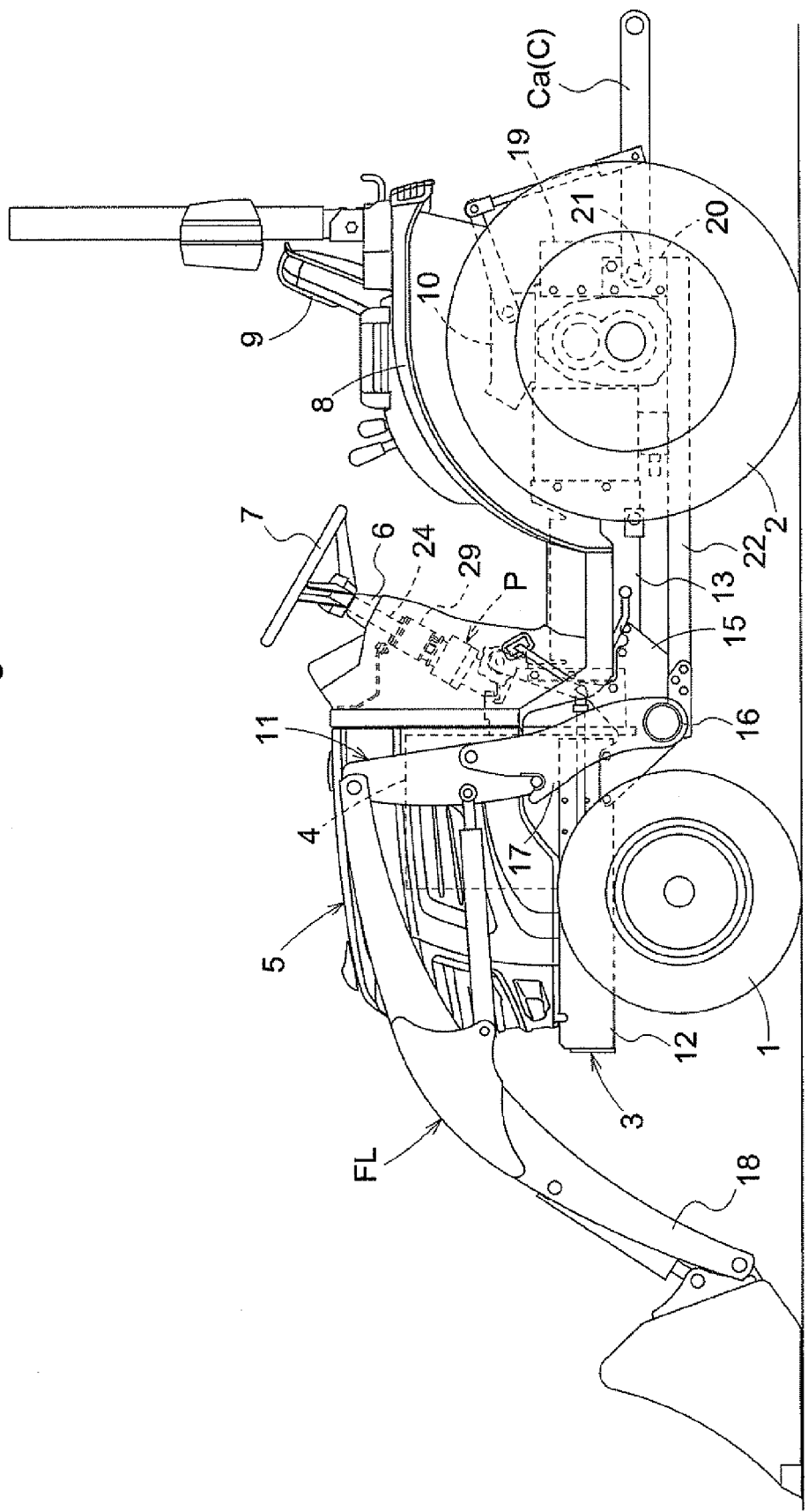
FIG. 1 is an overall side view of a tractor.

Here, the working vehicle will be described as a tractor. As shown in FIG. 1, the tractor includes, on the front side of a traveling body 3 equipped with front and rear wheels 1 and 2, an engine 4, an engine hood 5 covering the engine 4, a steering post cover 6 disposed in a rear portion of the engine hood 5, a steering wheel 7 disposed above the steering post 6, and a front loader device FL supported by brackets 11 vertically extended from both lateral sides of the engine hood 5, right and left rear wheel fenders 8 disposed on the rear side of the traveling body 3, a driver's seat 9 disposed between the right and left rear wheel fenders 8, and a mission case 10 disposed under the driver's seat 9.

Now a structure for supporting the front loader device FL will be described. As shown in FIG. 1, lateral side faces of engine supporting frames 12 disposed on the right side and the left side are connected to lateral side faces of a front end portion of a main frame 13 extended forwardly from the mission case 10 on the rear side with first supporting brackets 15 in a posture oriented in a fore-and-aft direction.

Figure 2:
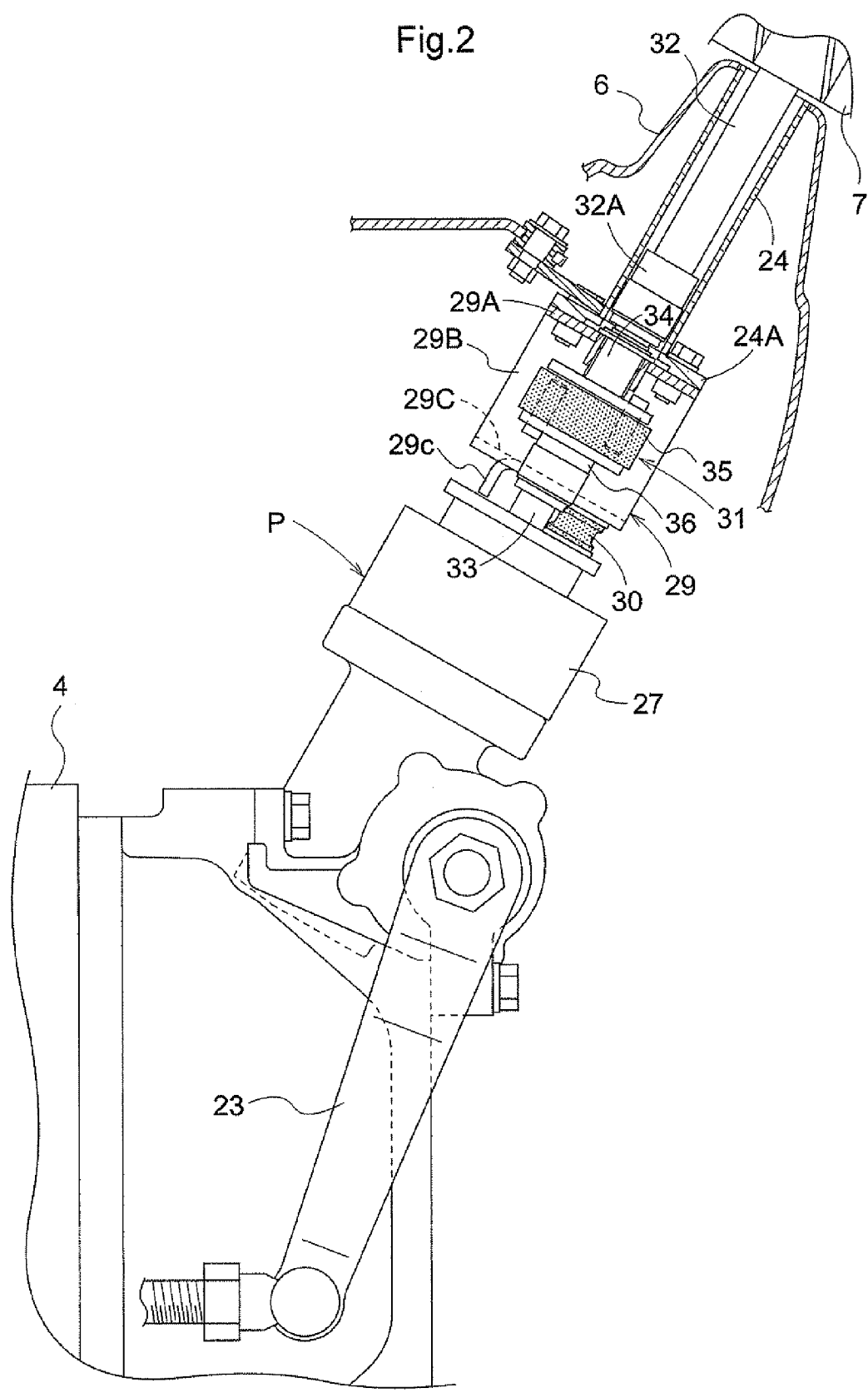
FIG. 2 is a longitudinal sectional side view showing a first steering shaft and a second steering shaft connected to each other via a rubber vibration isolator of a first embodiment.
Figure 3:
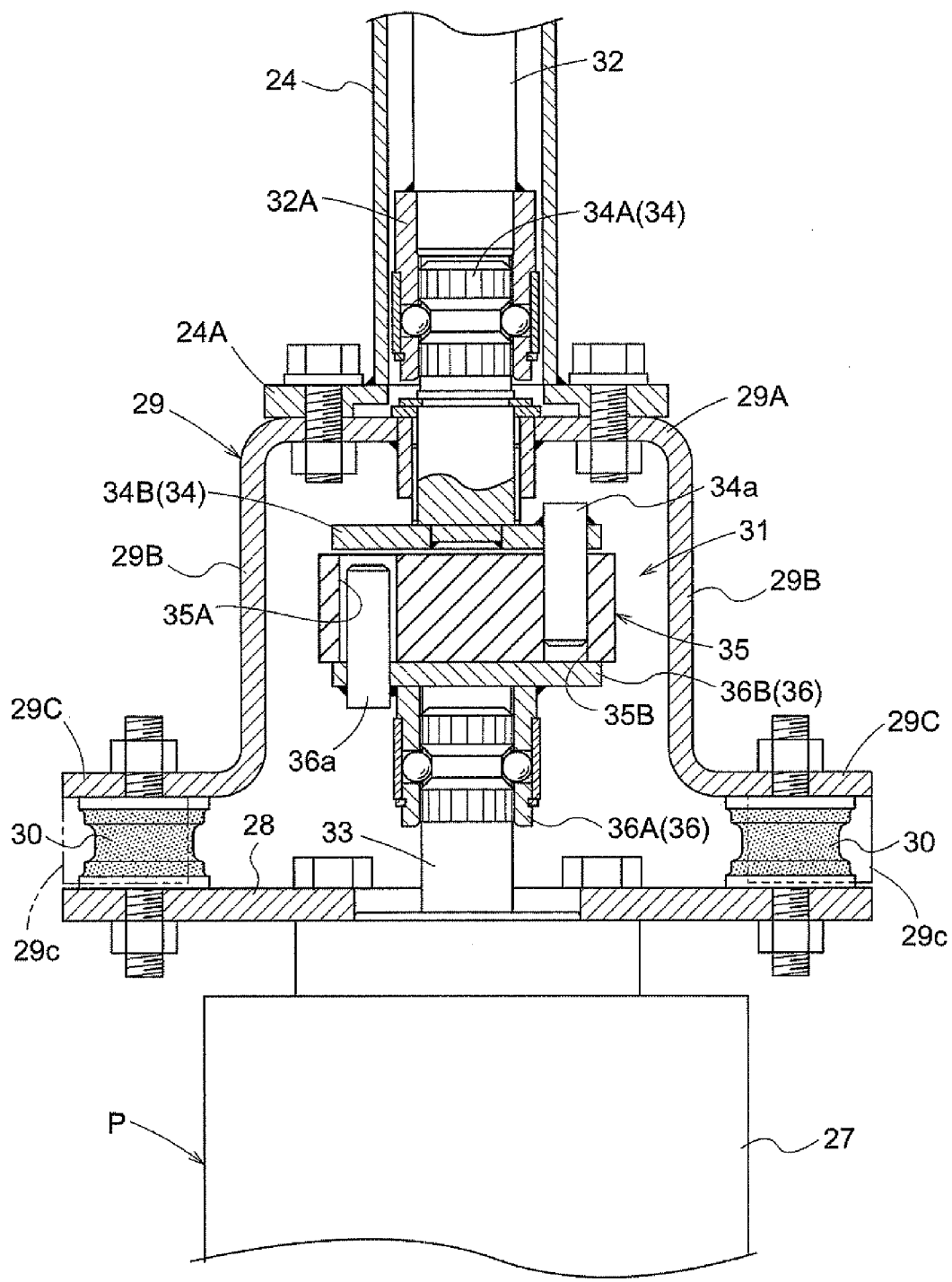
FIG. 3 is a longitudinal sectional front view showing a steering device of the first embodiment.

Next, the steering wheel vibration-isolating device will be described. As shown in FIGS. 1 to 3, a power steering unit P is placed within the engine hood 5, and a pitman arm 23 for steering a driving system having the front and rear wheels 1 and 2 is pivotably supported at the lower end position of a case 27 housing the power steering unit P, whereby a wheel steering mechanism is constructed.

A steering post 24 is provided above the power steering unit P and fixedly attached to a console box joined to the engine hood 5, and a first steering shaft 32 is supported by the steering post 24. The steering wheel 7 is attached to the upper end position of the first steering shaft 32 projecting to the outside of the console box.

Next, a structure for supporting the steering post 24 in a vibration-isolating manner with the case 27 housing the power steering unit P will be described. As shown in FIGS. 2 and 3, a flange-like receiving plate portion 28 is fixedly attached to the upper end position of the case 27, and a flanged portion 24A is provided at the lower end position of the steering post 24. A connecting member 29 is interposed between the receiving plate portion 28 and the flanged portion 24A to connect the receiving plate portion 28 and the flanged portion 24A to each other. Accordingly, the steering post 24 is supported by the case 27 housing the power steering unit P.

Figure 4:
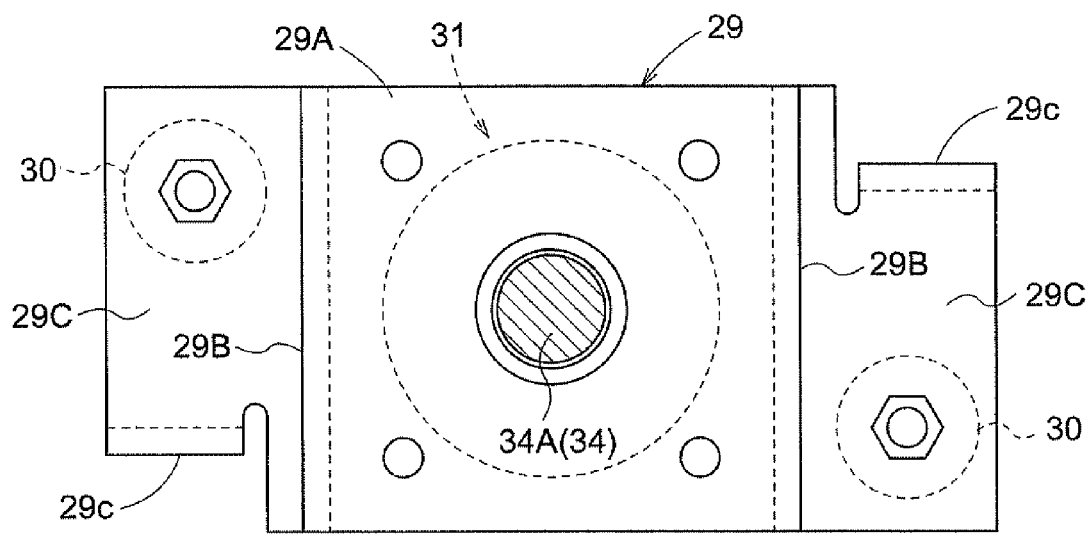
FIG. 4 is a plan view showing a connecting member.

As shown in FIGS. 3 and 4, the connecting member 29 has a flat top face portion 29A that is connected to and that receives the flanged portion 24A, skirts 293B drooped downwardly from both end positions of the flat top face portion 29A, and flat bottom face portions 29C formed at the lower end position of the right and left skirts 293.

As shown in FIGS. 2 and 3, rubber vibration isolators 30 are disposed between the right and left flat bottom face portions 29C and the receiving plate portion 28 disposed at the upper end position of the case 27, and the connecting member 29 is supported via the rubber vibration isolators 30. Thus, vibration from the power steering unit P is no longer easily transmitted to the steering post 24.

The connecting member 29 will be described in detail. As shown in FIGS. 3 and 4, the flat top face portion 29A has a square shape, and the skirts 29B having the same width as the flat top face portion 29A extend downwardly from the flat top face portion 29A. The lower end of the skirts 293B is bent horizontally to form the flat bottom face portions 29C, and the right and left flat bottom face portions 29C have a narrower width than the lower end width of the skirts 29B as shown in FIG. 4. The positions of the flat bottom face portions 29C are shifted from each other in the depth direction in such a manner that the flat bottom face portions 29C are point symmetric with respect to the axial center of the first steering shaft 32 and such that the left flat bottom face portion 29C is positioned on the back side in FIG. 4 and the right flat bottom face portion 29C is positioned on the front side.

As shown in FIGS. 3 and 4, a pair of right and left rubber vibration isolators 30 are disposed between the flat bottom face portions 29C and the receiving plate portion 28. The rubber vibration isolators 30 are respectively mounted to the right and left flat bottom face portions 29C. As is the case with the flat bottom face portions 29C, the positions of the rubber vibration isolators 30 are shifted from each other in the depth direction, and the rubber vibration isolators 30 are point symmetric with respect to the axial center of the first steering shaft 32. Accordingly, the two rubber vibration isolators 30 support the connecting member 29 in a vibration-isolating manner by being positioned in point-symmetric positions with respect to the axial center of the first steering shaft 32.

As shown in FIGS. 3 and 4, each of the flat bottom face portions 29C has a plate-like portion 29c extending downwardly from one of the side edges thereof in the depth direction of FIG. 3. The plate-like portions 29c are vertically suspended along the rubber vibration isolators 30 and extend to a position close to the top surface of the receiving plate portion 28 supporting the rubber vibration isolators 30. With such a configuration, when the rubber vibration isolators 30 shrink under a compression force, the shrinking of the rubber vibration isolators 30 is regulated by the plate-like portions 29c making contact with the receiving plate portion 28.

Next, a vibration-isolating connecting mechanism 31 that cuts off the transmission of vibration through a steering shaft will be described. As shown in FIGS. 2 and 3, the first steering shaft 32 connected to the steering wheel 7 is housed within the steering post 24, and a second steering shaft 33 juts out from the case 27 housing the power steering unit P. The vibration-isolating connecting mechanism 31 is interposed between the first steering shaft 32 and the second steering shaft 33, and thus the transmission of vibration from the power steering unit P to the steering wheel 7 is suppressed.

As shown in FIGS. 2 and 3, the vibration-isolating connecting mechanism 31 includes a coupling portion 32A secured to the lower end of the first steering shaft 32, a first connecting member 34 having a relay shaft 34A jutting out therefrom and being capable of engaging with and rotating integrally with the coupling portion 32A, a rubber vibration isolator 35 disposed under the first connecting member 34 and serving as the vibration-isolating body that supports the first connecting member 34 in a vibration-isolating manner, and a second connecting member 36 that receives the rubber vibration isolator 35 from below and transmits a rotational operating force, the second connecting member 36 being provided with a coupling material 36A into which the second steering shaft 33 vertically extended from the power steering unit P is fitted.

Figure 5:
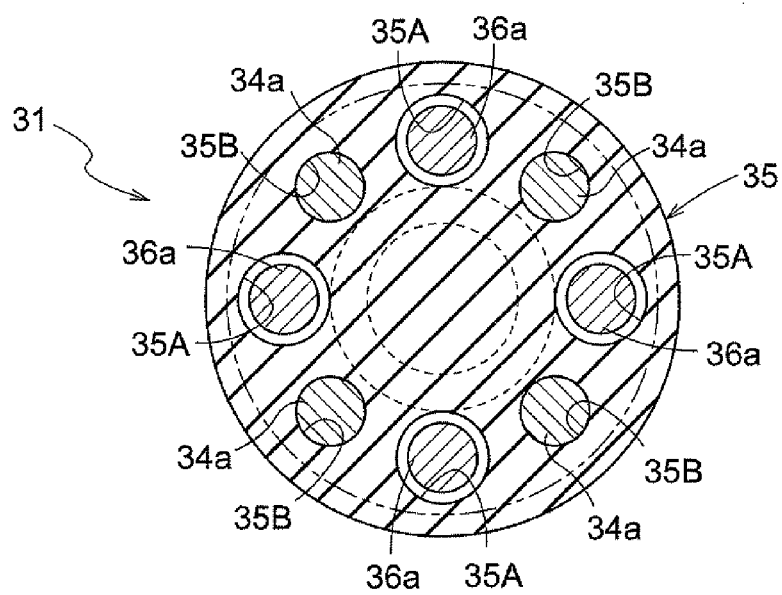
FIG. 5 is a transverse sectional plan view showing the rubber vibration isolator and the relationship between connecting pins and fitting holes.

As shown in FIGS. 3 and 5, flanged portions 34B and 36B are provided on the surfaces of the first connecting member 34 and the second connecting member 36 that make contact with the rubber vibration isolator 35, and four connecting pins 34a and 36a jut out from the flanged portions 34B and 36B toward each other. On the other hand, the rubber vibration isolator 35 has the shape of a considerably thick flat plate, and fitting holes 35A and 35B passing through the rubber vibration isolator 35 in the axial direction are formed at eight circumferential positions in the rubber vibration isolator 35.

As shown in FIG. 5, the hole diameters of the fitting holes 35A and 35B and the pin diameters of the connecting pins 34a and 36a are sized as described below. That is to say, regarding the fitting holes 35A and 35B, the fitting holes 35A having a large diameter and the fitting holes 35B having a small diameter are formed alternately, and the hole diameter of the small-diameter fitting holes 35B is the same as the pin diameter of the connecting pins 34a extended from the first connecting member 34. On the other hand, the hole diameter of the large-diameter fitting holes 35A is larger than the pin diameter of the connecting pins 36a extended from the second connecting member 36.

With a configuration as described above, when the angle of rotational displacement of each of the first steering shaft 32 and the second steering shaft 33 is within a range of rotation angles for linearly driving the vehicle, that is, in a state where the steering wheel 7 is operated in a linear drive position, the connecting pins 36a extended from the second connecting member 36 fit in the large-diameter fitting holes 35A without having contact with the inner circumferential surface of the large-diameter fitting holes 35A. Therefore, vibration from the second steering shaft 33 is not transmitted to the first steering shaft 32 or is suppressed.

As the steering wheel 7 is rotated from the above-described state, the angles of rotational displacement of the first steering shaft 32 and the second steering shaft 33 exceed the ranges of rotation angles for linearly driving the vehicle. During this operation, the connecting pins 34a extended from the first connecting member 34 drive the rubber vibration isolator 35 to rotate, and due to the rotation of the rubber vibration isolator 35, the large-diameter fitting holes 35A come into contact with the connecting pins 36a and apply a rotational operating force on the second connecting member 36. That is to say, the connecting members 34 and 36 are interlocked with each other via the rubber vibration isolator 35, so that vibration from the power steering unit P is suppressed from being transmitted to the steering wheel 7 by the rubber vibration isolator 35 absorbing the vibration. As a result, whether the steering wheel 7 is in the linear drive position or in a turn position, the propagation of vibration is suppressed, and the driver can have a comfortable steering feeling.

Second Embodiment

Figure 6:
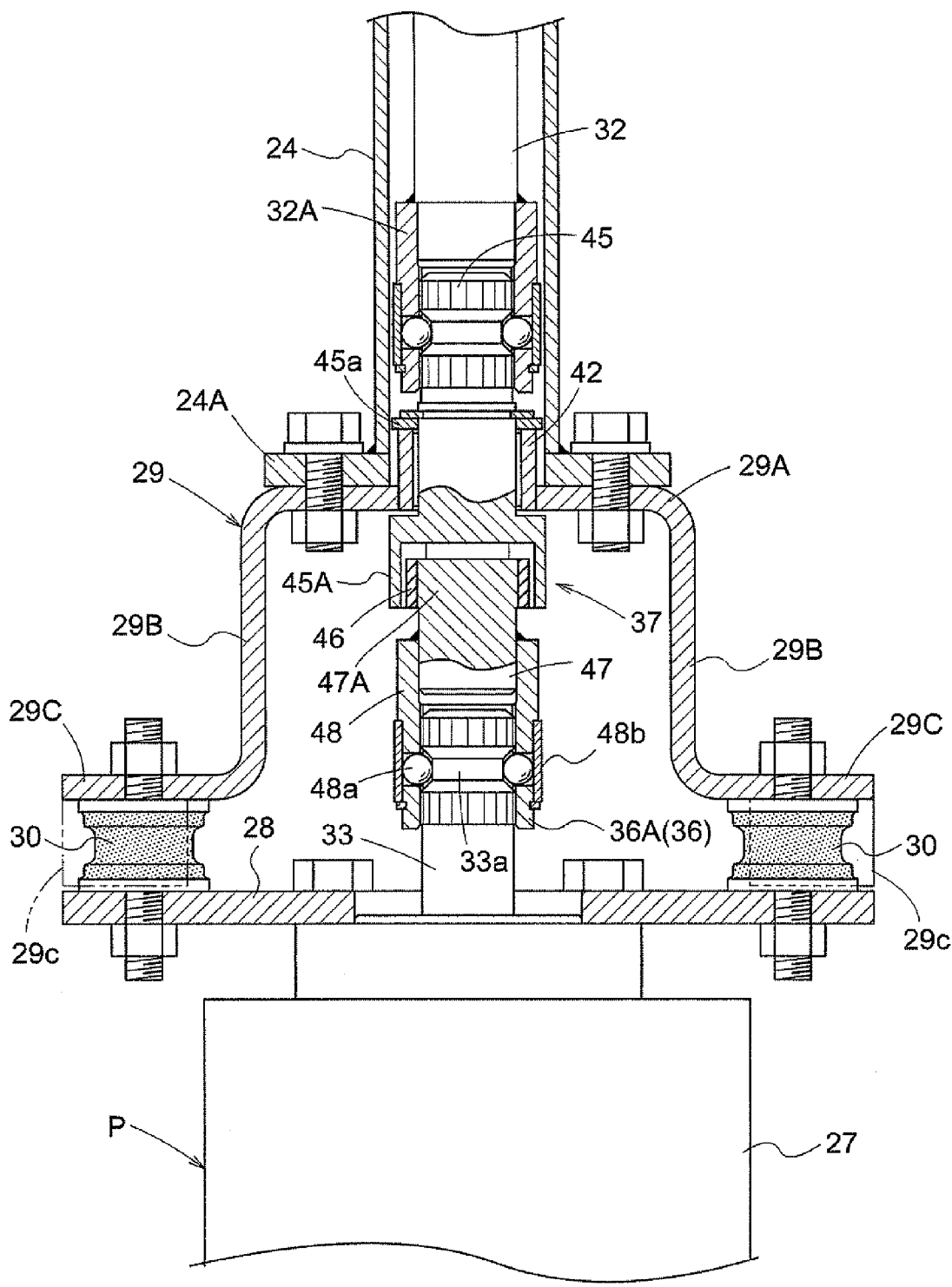
FIG. 6 is a longitudinal sectional side view showing a steering device of a second embodiment.

Here, a vibration-isolating device in which the vibration-isolating connecting mechanism 37 has a different form from that of the first embodiment will be described. As shown in FIG. 6, the receiving plate portion 28 is provided on the top surface of the case 27 housing the power steering unit P, and the connecting member 29 is attached above the receiving plate portion 28 via the rubber vibration isolators 30 as in the first embodiment. The connecting member 29 includes the flat top face portion 29A, the right and left skirts 29B, and the right and left flat bottom face portions 29C.

As shown in FIG. 6, each of the flat bottom face portions 29C has the plate-like portion 29c extending downwardly from one of the side edges thereof in the depth direction of FIG. 4. The plate-like portions 29c are vertically suspended along the rubber vibration isolators 30 and extend to a position close to the top surface of the receiving plate portion 28 supporting the rubber vibration isolators 30. With such a configuration, when the rubber vibration isolators 30 shrink under a compression force, the shrinking of the rubber vibration isolators 30 is regulated by the plate-like portions 29c making contact with the receiving plate portion 28.

Now the vibration-isolating connecting mechanism 37 for the steering shafts will be described. As shown in FIG. 6, the flat top face portion 29A of the connecting member 29 has a hole vertically passing through the flat top face portion 29A, a supporting boss 42 in a vertical posture is mounted in a state where the supporting boss 42 is fitted within the hole, and the supporting boss 42 extends upwardly from the hole.

An upper relay shaft 45 interlocking the first steering shaft 32 equipped with the steering wheel 7 with the second steering shaft 33 projecting from the case 27 housing the power steering unit P is inserted in the supporting boss 42. A shaft retaining ring 45a is mounted at a middle position between the upper and lower end lines of the upper relay shaft 45 and determines the position of the upper relay shaft 45, which is inserted in the supporting boss 42, in the vertical direction. A needle bearing is mounted within the supporting boss 42, thereby rotatably supporting the upper relay shaft 45.

Figure 7:
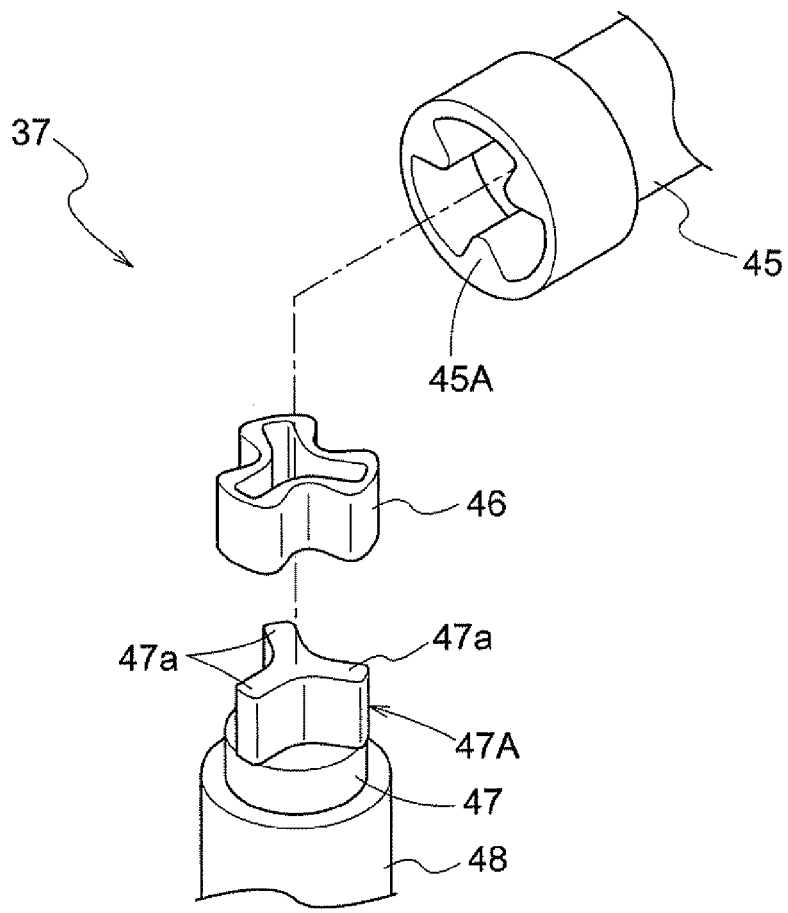
FIG. 7 is a perspective view showing a rubber vibration isolator of the second embodiment and a state of a linking boss portion of an upper relay shaft linked to the first steering shaft and a linking shaft portion linked to the second steering shaft before they are fitted to each other.
Figure 8:
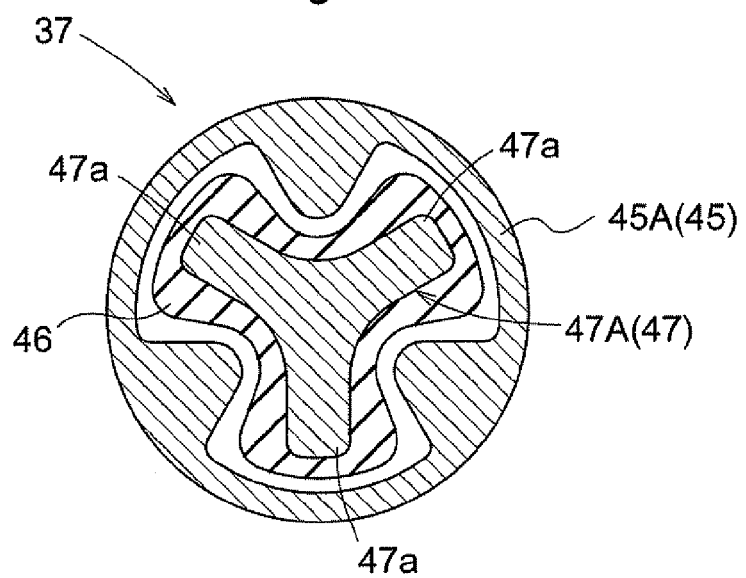
FIG. 8 is a transverse sectional plan view showing a state of the rubber vibration isolator and the linking shaft portion linked to the second steering shaft of the second embodiment when they are fitted to each other.

As shown in FIGS. 7 and 8, at a lower end portion of the upper relay shaft 45, an accepting member 45A constituting the vibration-isolating connecting mechanism 37 is formed integrally therewith, and a mounting space in which a rubber vibration isolator 46 is to be mounted is formed inside the circumferential wall of the accepting member 45A. The mounting space has approximately fan-shaped spaces formed respectively at three positions in the circumferential direction and having a certain width in the circumferential direction, and the rubber vibration isolator 46 can be accommodated in those spaces so that the rubber vibration isolator 46 is not allowed to rotate more than a slight rotation angle.

On the other hand, as shown in FIGS. 7 and 8, a lower relay shaft 47 is disposed under the accepting member 45A, and a non-circular member 47A having a Y-shape when viewed in the axial direction is formed on the upper end of the lower relay shaft 47. Three side portions 47a outwardly-extending in the Y-shape of the non-circular member 47A can respectively enter into and engage with approximately fan-shaped recessed portions of the accepting member 45A. When the angles of rotational displacement of the first steering shaft 32 and the second steering shaft 33 are within the ranges of rotation angles for linearly driving the vehicle, that is, in a state where the steering wheel 7 is operated in the linear drive position, a clearance is formed between the side portions 47a of the non-circular member 47A with the rubber vibration isolator 46 and the recessed portions of the accepting member 45A. When the angles of rotational displacement of the first steering shaft 32 and the second steering shaft 33 are beyond the ranges of rotation angles for linearly driving the vehicle, that is, in a state where the steering wheel 7 is operated to turn the vehicle, the three side portions 47a covered by the rubber vibration isolator 46 are brought into contact with one of the side walls of the respective recessed portions of the accepting member 45A, and thus the first steering shaft 32 and the second steering shaft 33 are rotated integrally.

As shown in FIG. 6, under the lower relay shaft 47, the second steering shaft 33 is extended upwardly from the case 27 housing the power steering unit P, and a coupling material 48 extending between a lower end portion of the lower relay shaft 47 and an upper end portion of the second steering shaft 33 is provided.

An annular recessed groove 33a is formed near the upper end of the second steering shaft 33, and an engaging ball body 48a mounted inside the coupling material 48 engages with the annular recessed groove 33a. A plate spring material 48b is mounted on the outer circumferential surface of the coupling material 48 and biases the engaging ball body 48a in an inward direction to engage the ball body 48a with the annular recessed groove 33a.

With such a configuration, the engaging ball body 48a engages with the annular recessed groove 33a, and the engaged state is maintained by the plate spring material 48b, as shown in FIG. 6. Accordingly, the coupling material 48 is maintained in an engaged state while extending between the lower end portion of the lower relay shaft 47 and the upper end portion of the second steering shaft 33. The coupling material 48 and the lower relay shaft 47 are formed integrally so as to rotate integrally with each other, and the coupling material 48 and the second steering shaft 33 are spline-fitted. Thus, a steering wheel operating force is transmitted from the lower relay shaft 47 to the second steering shaft 33 via the coupling material 48.

Other Embodiments (1) An embodiment may also be employed in which, in FIGS. 3 and 5, the large-diameter fitting holes 35A and the small-diameter fitting holes 35B are formed so that the hole diameter of the large-diameter fitting holes 35A is the same as the diameter of the connecting pins 36a extended from the second connecting member 36 and the hole diameter of the small-diameter fitting holes 35B is larger than the diameter of the connecting pins 34a extended from the first connecting member 34, and a clearance is created between the small-diameter fitting holes 35B and the connecting pins 34a extended from the first connecting member 34.

(2) In the configuration shown in FIGS. 3 and 5 and in the embodiment described in the foregoing paragraph (1), it is also possible that the fitting holes 35A and the fitting holes 35B all have the same hole diameter, and the external diameter of the connecting pins 34a extended from the first connecting member 34 or the external diameter of the connecting pins 36a extended from the second connecting member 36 is set to a slightly smaller diameter.

(3) In the embodiment shown in FIGS. 3 and 5 and in the embodiments described in the foregoing paragraphs (1) and (2), it is also possible that a clearance is created between a part (e.g., two) of the four connecting pins 34a extended from the first connecting member 34 and the corresponding fitting holes 35B, and no clearance is created between the rest of the connecting pins 34a extended from the first connecting member 34 and all of the connecting pins 36a extended from the second connecting member 36 and the corresponding fitting holes 35A and 35B.

(4) In the embodiment shown in FIGS. 3 and 5 and in the embodiments described in the foregoing paragraphs (1) and (2), it is also possible that a clearance is created between a part (e.g., two) of the four connecting pins 36a extended from the second connecting member 36 and the corresponding fitting holes 35A, and no clearance is created between the rest of the connecting pins 36a extended from the second connecting member 36 and all of the connecting pins 34a extended from the first connecting member 34 and the corresponding fitting holes 35A and 35B.

(5) A soft resin or a sponge or the like can be used instead of the rubber vibration isolator 35.

What is claimed is:

1. A vibration-isolating device for a steering wheel of a traveling working vehicle equipped with a wheel steering mechanism, comprising:
   a first steering shaft that transmits rotational displacement, the first steering shaft being operatively connected to the steering wheel;

a second steering shaft that transmits rotational displacement, the second steering shaft being operatively connected to the wheel steering mechanism;

a vibration-isolating connecting mechanism that operatively connects the first steering shaft and the second steering shaft to each other so that rotational displacement can be transmitted, whereby when the angles of rotational displacement of the first and second steering shafts are within ranges of rotation angles for linearly driving the vehicle, rotational displacement cannot be transmitted between the first steering shaft and the second steering shaft, and when the angles of rotational displacement of the first and second steering shafts are beyond the ranges of rotation angles for linearly driving the vehicle, rotational displacement can be transmitted between the first steering shaft and the second steering shaft; and wherein the vibration-isolating connecting mechanism has at least one engage member connected to one of the first and second steering shafts, at least one opposite engage member connected to the other one of the first and second steering shafts, and a vibration-isolating rubber member disposed between the engage member and the opposite engage member; and when the angles of rotational displacement of the first and second steering shafts are within the ranges of rotation angles for linearly driving the vehicle, at least one of the engage member and the opposite engage member is not in contact with the vibration-isolating rubber member, and when the angles of rotational displacement of the first and second steering shafts are beyond the ranges of rotation angles for linearly driving the vehicle, the engage member and the opposite engage member are in contact with the vibration-isolating rubber member.

2. The vibration-isolating device according to claim 1, wherein the engage member and the opposite engage member are projections projecting from one of the steering shafts toward the other one of the steering shafts, and the vibration-isolating rubber member has openings that receive the projections therein.

3. The vibration-isolating device according to claim 2, wherein the engage member is formed as a connecting pin, the opposite engage member is formed as an opposite connecting pin, the openings of the vibration-isolating rubber member are formed as a fitting hole fitting to the connecting pin or an opposite fitting hole fitting to the opposite connecting pin, the hole diameter of the fitting hole is the same as the pin diameter of the connecting pin, and the hole diameter of the opposite fitting hole is larger than the pin diameter of the opposite connecting pin.

4. The vibration-isolating device according to claim 1, wherein the engage member is an accepting member connected to one of the steering shafts, the opposite engage member is a non-circular member connected to the other one of the steering shafts and accommodated in an internal space defined by a circumferential wall of the accepting member, and the vibration-isolating rubber member has a shape that is interposed in a space between the circumferential wall of the accepting member and the non-circular member in a radial direction.

5. The vibration-isolating device according to claim 1, wherein the first steering shaft is supported on a vehicle body of the working vehicle via a vibration-isolating member.

* * * * *